(12) United States Patent
Kan et al.

(10) Patent No.: US 10,652,037 B2
(45) Date of Patent: May 12, 2020

(54) NOTIFYING AFFECTED USERS OF FEATURE CHANGES IN A SOFTWARE APPLICATION

(71) Applicant: Microsoft Technology Licensing, LLC, Redmond, WA (US)

(72) Inventors: Jimmy Yu Hin Kan, Sammamish, WA (US); Michal Miriam Swafford, Bellevue, WA (US); Dennis Borisovitch Zverev, Seattle, WA (US); Abhinav Garg, Seattle, WA (US); Rong Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 15/829,236

(22) Filed: Dec. 1, 2017

(65) Prior Publication Data
US 2019/0097825 A1    Mar. 28, 2019

Related U.S. Application Data

(60) Provisional application No. 62/562,643, filed on Sep. 25, 2017.

(51) Int. Cl.
*G06F 15/16* (2006.01)
*H04L 12/18* (2006.01)
*G06F 16/951* (2019.01)

(52) U.S. Cl.
CPC ........ *H04L 12/1895* (2013.01); *G06F 16/951* (2019.01)

(58) Field of Classification Search
CPC ........................ H04L 12/1895; G06F 16/951

USPC ..................................................... 709/206
See application file for complete search history.

(56) References Cited

U.S. PATENT DOCUMENTS

| 8,286,143 | B2 * | 10/2012 | Garimella ........... G06F 11/3688 717/124 |
| 9,440,748 | B1 * | 9/2016 | Lentz .................... G06F 16/284 |
| 9,467,500 | B2 | 10/2016 | Maturana et al. |
| 9,471,700 | B2 | 10/2016 | Naqvi |
| 2008/0172300 | A1 * | 7/2008 | Karki .................... G06Q 30/06 705/26.8 |
| 2014/0059217 | A1 | 2/2014 | Pizurica |

(Continued)

OTHER PUBLICATIONS

"Amazon CloudWatch: User Guide", Retrieved from: <<https://web.archive.org/web/20160823160014/http:/docs.aws.amazon.com/AmazonCloudWatch/latest/monitoring/acw-ug.pdf>>, Aug. 23, 2016, 240 Pages.

*Primary Examiner* — Atta Khan

(57) ABSTRACT

Systems, methods, and software are disclosed herein for operating a notification service for notifying affected users of modifications made to features in a software application. The notification service maintains a database comprising a list of the features in the software application and a list of users associated with each of the features. The notification service detects at least a modification to a feature in the software application that requires affected users to be notified. In response to detecting the modification to the feature, the notification service queries the database based at least on an identify of the feature associated with the modification to identify the affected users. Notifications are then generated and communicated to the affected users indicative of at least the modification to the feature in the software application.

20 Claims, 7 Drawing Sheets

(56) References Cited

U.S. PATENT DOCUMENTS

2014/0336791 A1    11/2014   Asenjo et al.
2015/0019701 A1     1/2015   Marvin et al.
2016/0308940 A1    10/2016   Procopio et al.
2017/0148280 A1     5/2017   Desalle et al.

* cited by examiner

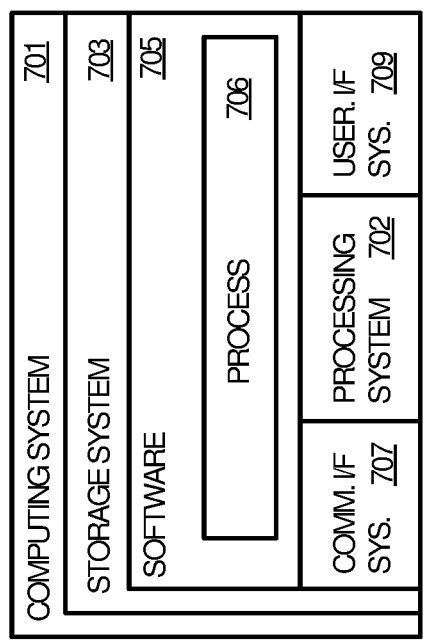

NOTIFYING AFFECTED USERS OF FEATURE CHANGES IN A SOFTWARE APPLICATION

RELATED APPLICATIONS

This application claims priority to U.S. Provisional Patent Application No. 62/562,643, entitled "AUTOMATED MODIFIED FEATURE NOTIFICATION", filed on Sep. 25, 2017, which is incorporated by reference herein in its entirety.

TECHNICAL FIELD

Aspects of the disclosure are related to computing hardware and software technology, and in particular to notifying affected users of feature changes in a software application.

TECHNICAL BACKGROUND

Various commercial/consumer services continuously modify existing features and integrate additional features into current services (e.g. Office 365®). A typical result leaves many users unaware of the change in the service in a timely manner. Some users registered for these services may want to be notified about some modification to the feature in the services as soon as the change has been made. However, other users registered for the service may not want to be notified about the modification to the features.

Typically, a determination on which modification to the feature s qualify for a notification are determined by a service program manager. The service program manager then determines the users that need to be notified of the change. When dealing with only a few users or only a couple changes to the features, things become fairly simple. A service program manager may determine on a case-by-case basis which features should be communicated and to which users.

When many changes are being made to a service, such as during a rollout of a new service with many stages, it can become increasingly difficult to monitor which modifications to the features qualify for a notification, which users the modifications should be communication to, and how each of the users prefers to receive the notification. While some current services may provide user communications based on changes to features in a software application, these services are limited in timeliness in detection of the change, determination of affected users, and generation of appropriate notification messages.

Overview

An enhanced notification service is disclosed herein that improves detection of modified features in a software application and notification of the modified features to users. In various implementations, a notification system maintains a database comprising a list of the features in the software application and a list of users associated with each of the features. A modification to a feature is then detected in the software application that requires affected users to be notified. The notification service queries the database to identify the affected users and notifications are generated and communicated to the affected users indicating the modification to the feature in the software application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 7 illustrates a computing system suitable for implementing the notification technology disclosed herein, including any of the architectures, processes, operational scenarios, and operational sequences illustrated in the Figures and discussed below in the Technical Description.

TECHNICAL DESCRIPTION

Figure 1:
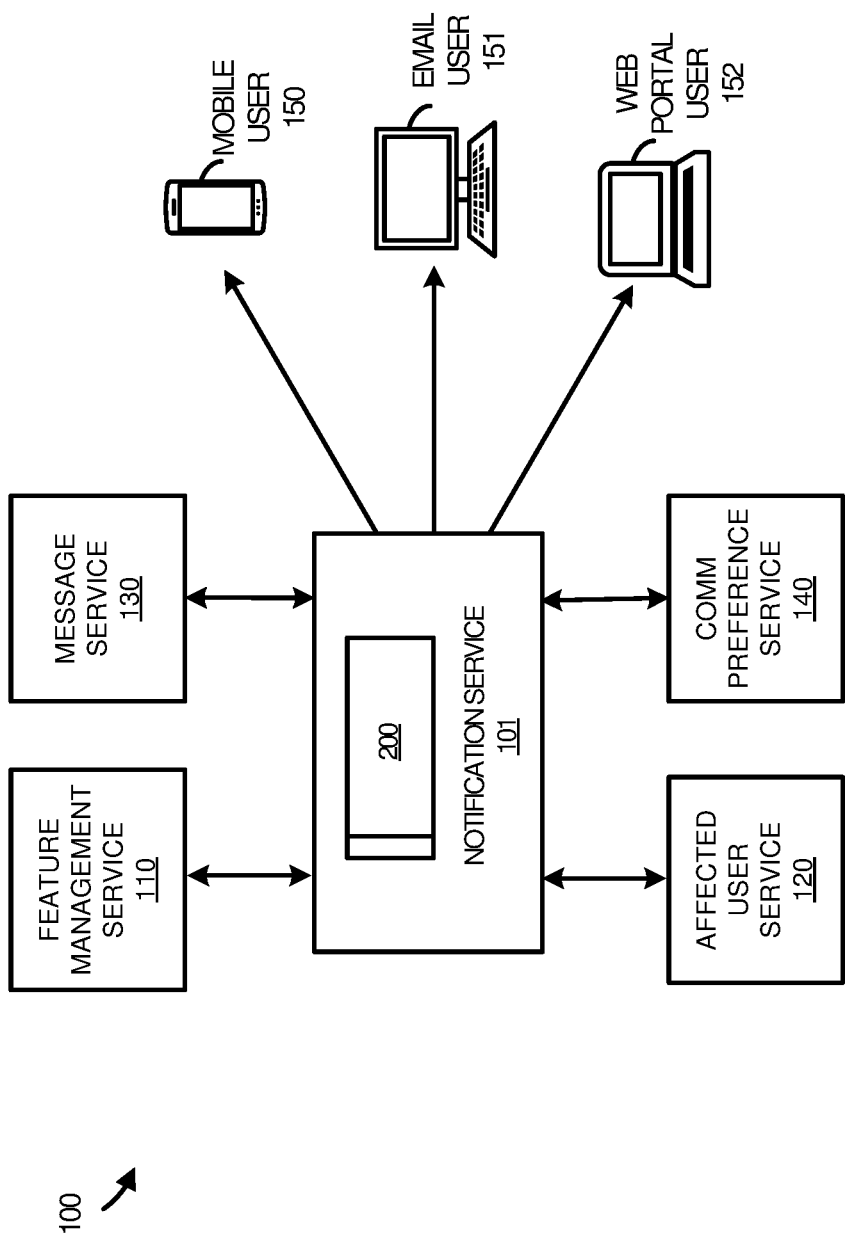
FIG. 1 illustrates an operational architecture for implementing an enhanced notification service.

Examples of the present disclosure describe a notification service for notifying affected users of modifications made to features in a software application. The implementations described herein are configured to maintain a database comprising a list of the features in the software application and a list of users associated with each of the features and detect at least a modification to a feature in the software application that requires affected users to be notified. Examples described herein are further configured to query the database based at least on an identify of the feature associated with the modification to identify the affected users, and generate and communicate notifications to the affected users indicative of at least the modification to the feature in the software application.

The notification service described herein improves efficiency in detecting the change to the feature (e.g., for automatically detecting when a major change to a software application has been made) which automatically determines affected users of the software application and triggers a notification to be generated and communicated to the affected users. In some implementations, the notification service also improves the efficiency in notifying affected users of the change based user notification preferences (e.g., alerting users of the change to the service using the communication channel preferred by each user, such as an email, a web portal message, or a mobile application message).

Further, examples herein allow a service provider to determine as soon as a major change to a service has occurred. Processing operations described herein may be configured to automatically detect when a change occurs in a feature management system (e.g., a flighting system) and can determine that the change in service is a major change that qualifies for a notification. A major change may be a new feature in the software application or a new software application all together that requires the administrator to be immediately alerted on the user endpoint. Other major changes to a service may be a feature qualifying as a major update, changes to a storage limitation, or any other feature affecting user productivity.

Processing operations may determine when changes are made by continuously monitoring the flighting system and automatically detecting that features are being turn on or off using a flighting switch. Furthermore, processing operations may determine that the change is a major change by determining that a flag is associated with the feature indicating that the modification is a major change. A major update that affects users may be flagged in a rollout process of a new software application. However, other changes made during the rollout process may not significantly impact users and therefore, may not be flagged by the flighting system for a notification (e.g., relocating an icon on the user interface in the software application).

Examples described herein may further extend to determining the change in the software application for different users at different points in time. A code may be deployed in a manner that switches are turned on and off for specific users at specific points in time of a rollout process. Therefore, processing operations described herein may be configured to automatically notify a specific set of users at the time the flight switch is turned on or off but not all of the users of the service. For example, in a first release program, customers may opt-in to a logical ring to receive features first before the feature goes worldwide. Therefore, the operations described herein may be used to notify only the users in the first release program that are immediately affected by the change in the software application and notify the rest of the users at a later milestone in the rollout of the new software application.

Examples described herein may further extend to automatically drafting the notification message for each user based on the change to the software application, the type of user affected, and user communication preferences. Processing operations described herein may be configured to identify user communication preferences and trigger notifications to customers in an automated manner (e.g. web application, mobile portal application, and email). In this example, processing operations may further utilize a communication manager to automatically match the flagged modification to the feature with a name of a drafted communication where the drafted communication is populated with content describing the scope of the major change in the software application. Each user may also receive a variation of the content depending on their user type (e.g., an administrative user versus a standard user). The message is then delivered to users based on the user communication channel preference (e.g., a web application message, a mobile application message, and an email).

FIG. 1 illustrates an exemplary operational architecture 100 related to processing operations for management of an exemplary enhanced notification system with which aspects of the present disclosure may be practiced. Operational architecture 100 includes notification service 101 connected to feature management service 110, affected user service 120, media service 130, and communication preference service 140. Notification service 101 is also connected to mobile user 150, email user 151, and web portal user 152. Notification service 101 also includes a notifying process 200.

Notification service 101 provides an organizational presence for notifying affected users of modifications made to features in a software application. Notification service 101 may monitor feature management service 110 to detect a change in a feature unit to be delivered to end users 150-152. Notification service 101 may be implemented on one or more computing systems, of which computing system 700 in FIG. 7 is representative. Notification service 101 provides improvements to efficiency in that the modification to the feature units are automatically detected when the change is made in to the software application (e.g., the feature switch is automatically detected by notification service 101 while monitoring feature management service 110). Notification service 101 additionally improves the efficiency in automatically identifying the affected users of the modification to the feature and communicating the notification to affected users.

Feature management service 110 facilities the release of features to end users in a software application. Feature management service 110 may be controlled by a service program manager to dynamically activate, deactivate, update, or perform any other modification to a feature in a software application. This allows incremental feature changes to be released quickly, such as during a product rollout process. A modification to the features may include a new application, a major update, changes to a storage limitation, and any other feature affecting user productivity. Feature management service 110 governs feature exposure in both physical (e.g. datacenter, machine) and logical (e.g. tenant attributes) scopes. Feature management service 110 may be included in notification service 101 or may be stored external to notification service 101 and queried by notification service 101 based on detection of a modification to the feature.

Affected user service 120 tracks which modifications to features in a software application affect different users. Affected user service 120 may also track which of the modifications to the features affect different types of users at different milestones in a rollout process of the software application. A list of affected users from a scope change can be calculated using various methods. Affected user service 120 may track affected users based on a user type in the software application, user interaction history with the service, user profile preferences, or some other technique for allocating a user as being affected by the modification to the feature. For example, the modification for a storage limitation feature may only be communicated to administrative users. However, an update to an inbox feature may be communicated to any user subscribed to receive notifications on the particular update. In other examples, the affected group may include first rollout users requesting to receive features and associated notifications before the worldwide users. Affected user service 120 may be included in notification service 101 or may be stored external to notification service 101 and monitored by notification service 101.

Message service 130 automatically generates the notifications based on the name of the modification to the feature. Message service 130 may store various notification message templates including drafted instructions and other information pertaining to the feature modification. More specifically, message service 130 may automatically populate the content field of a notification message with information within the scope of the modification to the feature by matching a feature name with an associated feature field in message service 130. The generated message will subsequently be used to deliver the modification to the feature information to the affected users. Message service 130 may be located within notification service 101 or an external service that maintains draft content used to automatically generate the notification based on the name of the modification to the feature.

Communication preference service 140 provides notification service 101 with user communication preferences. Communication preference service 140 may associate a web portal address, an email address, or a mobile application address with the affected user that will be used to deliver the generated notification. The user communication preferences may be determined based on user instructions, user interaction history, or some other method of determining a user's communication channel preference. In either scenario, the generated notification may be delivered to the affected users using the preferred user communication channel. Communication preference service 140 may be located within notification service 101 or an external service that maintains user communication preference information.

Figure 2:
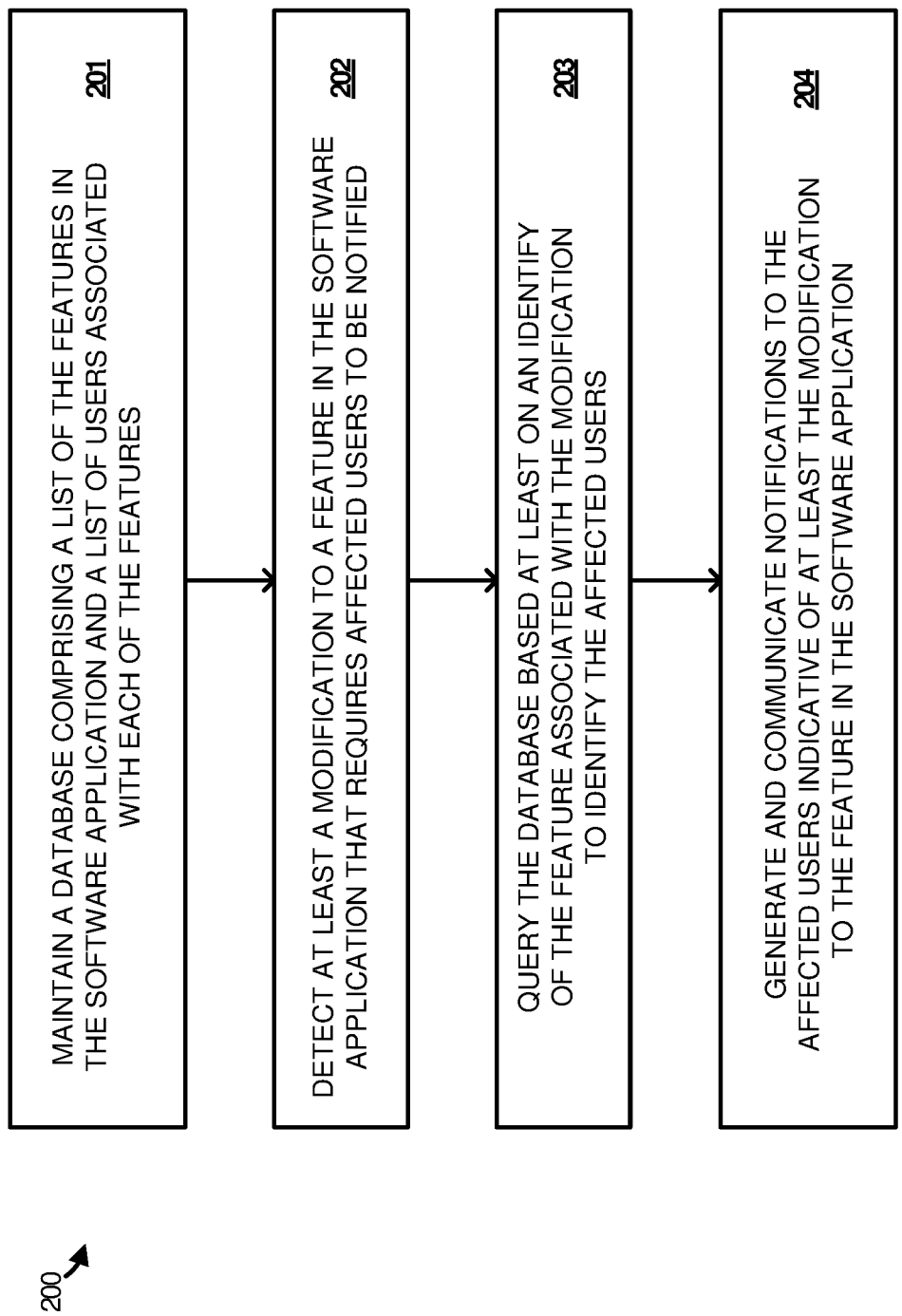
FIG. 2 illustrates a notifying process employed in implementations of an enhanced notification service.

FIG. 2 illustrates a notifying process employed in implementations of an enhanced notification service. Notifying process 200 may be implemented in program instructions in the context of any of the hardware, firmware, software applications, modules, components, or other such program elements that comprise the notification service. The program instructions direct notification service 101 to operate as follows.

In operation, notification service 101 maintains a database comprising a list of the features in the software application and a list of users associated with each of the features (201). The list of features may include various distinguishing characteristics of the software application that may affect the user performance and productivity when using the software application. The list of features may be dynamically updated based on changes to the existing features included in the software application. The list of users associated with each of the features may also be dynamically updated based on which features are available to each user. The list of users may additionally include user type information, user preference information, user history information, and various other type of user data that may be associated with each of the features on the feature list. Different features or versions of features may be available to different types of users. For example, first release users may have access to features on the feature list before standards users have access to the features. Notification service 101 may maintain the database internally or query an external database which maintains and dynamically updates the feature lists and the user list associated with each of the features.

In a next operation, notification service 101 detects at least a modification to a feature in the software application that requires affected users to be notified (step 202). In some implementations, notification service 101 monitors a flighting system for a modification to a flight. A flight is a feature unit to be delivered to end users. A flight management system governs the exposure of a flight. In another implementation, notification service 101 may detect the modification to the feature in the flighting system based on one of: a feature activation in the software application and a feature deactivation in the software application. In other implementations, notification service 101 may automatically detect that features are being turn on or off using a feature switch. The feature switch may be associated with a feature activation in the software application, a feature deactivation in the software application, a feature update in the software application, or any other feature change in the software application.

After detecting the modification to the feature in the software application, notification service 101 queries the database based at least on an identify of the feature associated with the modification to identify the affected users (step 203). Notification service 101 may determine that the modification to the feature qualifies for a user notification by detecting a flag associated with the feature switch in feature management service 110. The flag indicates that the modification to the feature significantly alters a user experience with the service and requires notification to the one or more of affected users. Notification service 101 may then only query the database if the identified feature includes a flag indicating that a notification is required.

In some implementations, notification service 101 retrieve user profile data from affected user service 120 to determine a set of users of the affected user list requiring the notification of the modification to the feature in the software application. Notification service 101 may determine that the modification to the feature in the software application is implemented for different users at different points in time. Notification service 101 may then determine which set of affected users should be notified of the modification based on the user type and the flagged feature being turned on or off for the set of users, such as users participating in a first release program.

In a final operation, notification service 101 generates and communicates notifications to the affected users indicative of at least the modification to the feature in the software application (step 204). In some implementations, notification service 101 determines user communication preferences. The user communication preferences may include a web application message, a mobile application message, and an email. In this implementation, notification service 101 may query communication preference service 140 for the user communication preferences. In other implementations, the database may include the user communication preferences associated with each user.

In some implementations, notification service 101 may retrieve the notification from message service 130. Message service 130 may automatically draft the notification message for each user based on the change to the service, the user type, and user communication preferences. Notification service 101 may further utilize message service 130 to automatically match the flagged feature change with a name of a drafted communication. The drafted communication may be populated with content describing the scope of the modification to the feature in the software application. Once the notification has been generated, notification service 101 may transfer the user notification to a set of affected users based on user preferences.

Figure 3:
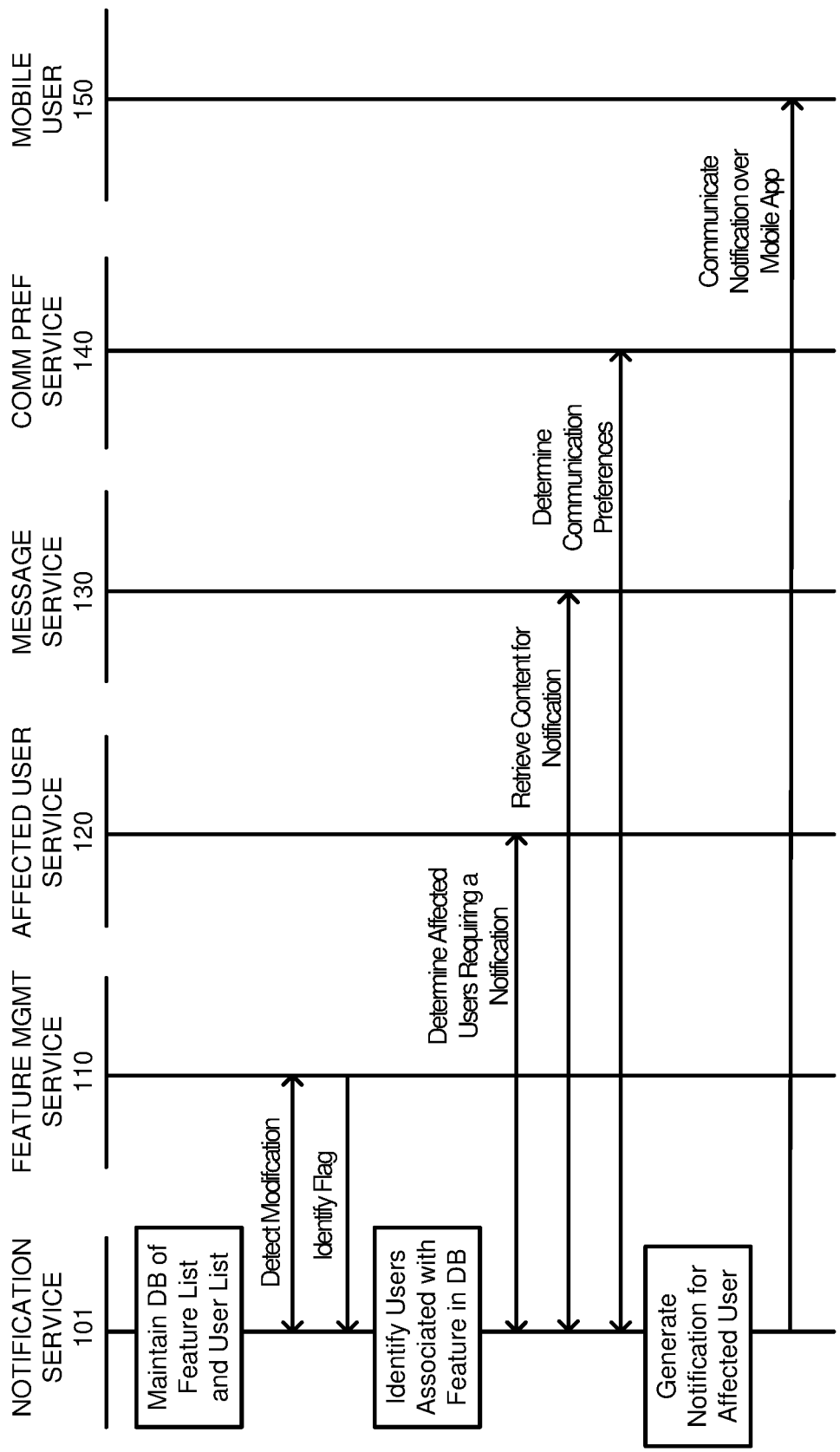
FIG. 3 illustrates a sequence diagram employed in implementations of an enhanced notification service.

FIG. 3 illustrates a sequence diagram of notification system 100 employed for notifying affected users of modifications made to features in a software application in implementations. In a first operation, notification service 101 maintains a database comprising a list of the features in the software application and a list of users associated with each of the features. Although not shown, notification service 101 is also continuously monitoring feature management service 110 for any changes to features, such as a product service manager interacting with bits on the in feature management system to activate or deactivate a switch associated with a feature.

Notification service 101 then detects a modification to a feature in feature management service 110. Notification service 101 also identifies that the feature that has been modified includes an associated flag indicating that a change to the feature requires affected users to be notified. In response to detecting that the modified feature includes a flag, notification service 101 queries the database based at least on an identify of the feature associated with the modification to identify the users associated with the feature that may be affected by the modification. In this implementation, notification service 101 then queries affected user service 120 to determine which of the affected users require a notification. Notification service 101 may also determine which affected users require the notification internally using the database.

At this point in the process, notification service 101 may also retrieve drafted content for the notification based on each affected user from message service 130. Notification service 101 may also determines a communication channel preference for each affected user requiring the notification, such as a mobile application, by querying communication preference service 140. It should be noted that in other implementations the content for the notification may be drafted and the communication channel preferences may be determined internally by notification service 101.

In response to retrieving the drafted content for the notification and the communication preferences for each affected user, notification service 101 generates a notification for each of the affected users based on the user type, communication preference, and modification to the feature. In a final step in the process, notification service 101 communicates the notifications to the affected users indicative of at least the modification to the feature in the software application. For example, notification service 101 communicates the notification to mobile user 150 over a mobile application.

Figure 4:
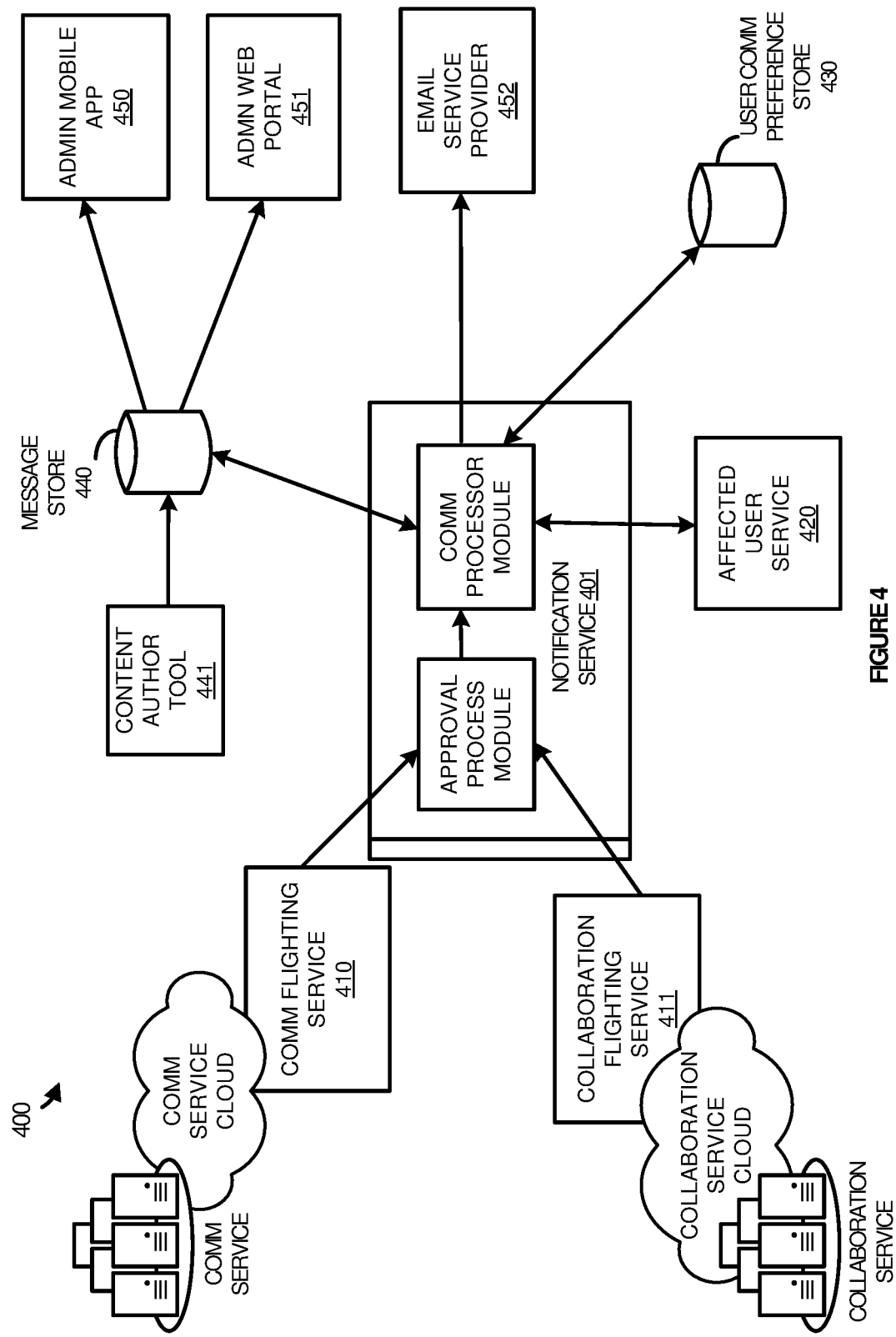
FIG. 4 illustrates an operational scenario in an implementation of an enhanced notification service.

FIG. 4 illustrates an operational architecture for detecting real-time (or near real-time) flight changes in a flighting system and notifying affected users using generated notifications that may be used in one or more scenarios of the present technology. Notification system 400 comprises notification service 401, which includes an approval process module and a communication processor module. The approval process module and the communication processor module perform operations to detect modifications to the features and notify affected users as discussed further in FIG. 5.

Notification system 400 includes a communication service, a communication cloud service, and communication flighting service 410. Notification system 400 also includes a collaboration service, a cloud collaboration service, and collaboration flighting service 411. The communication service may be a mail and calendar service, such as Exchange® and communicates with communication flighting service 410 over the communication cloud service. Communication flighting service 410 may be used by the communication cloud service to flight new or updated features in the communication service. On another hand, collaboration service may be a browser-based collaboration and document management service, such as SharePoint® and communicates with collaboration flighting service 411 over the collaboration cloud service. Collaboration flighting service 411 may be used by the collaboration cloud service to flight new or updated features in the collaboration service.

Still referring to FIG. 4, notification system 400 also includes affected user service 420 and user communication preference store 430. In some implementations, affected user service 420 may be a topology expansion service. Affected user service 420 generates user profile data indicating a set of administrative users of the affected user list requiring the notification of the modification to the feature from flighting services 410-411. User communication preference store 430 stores data to determine a communication channel preferred by each user, such as an email, a web portal message, or a mobile application message.

Also included in FIG. 4 are message store 440, content author tool 441, and preferred communication channels 450-452. Message store 440 receives instructions from notification service 401 to generate notification messages and transfer the notification messages to various preferred communication channels, such as administrator mobile application 450 and administrator web portal 451. Content author tool 441 is used to generate the notification message. Content author tool 441 maintains draft content used to automatically generate the notification based on the name of the modification to the feature. Content author tool 441 automatically populates the content field of the notification with information within the scope of the modification to the feature by matching a flight name with an associated flight field. The generated message will subsequently be used to deliver the modification to the feature information to the affected users. The preferred communication channels comprise administrator mobile application 450, administrator web application 451, and email service provider 452.

Figure 5:
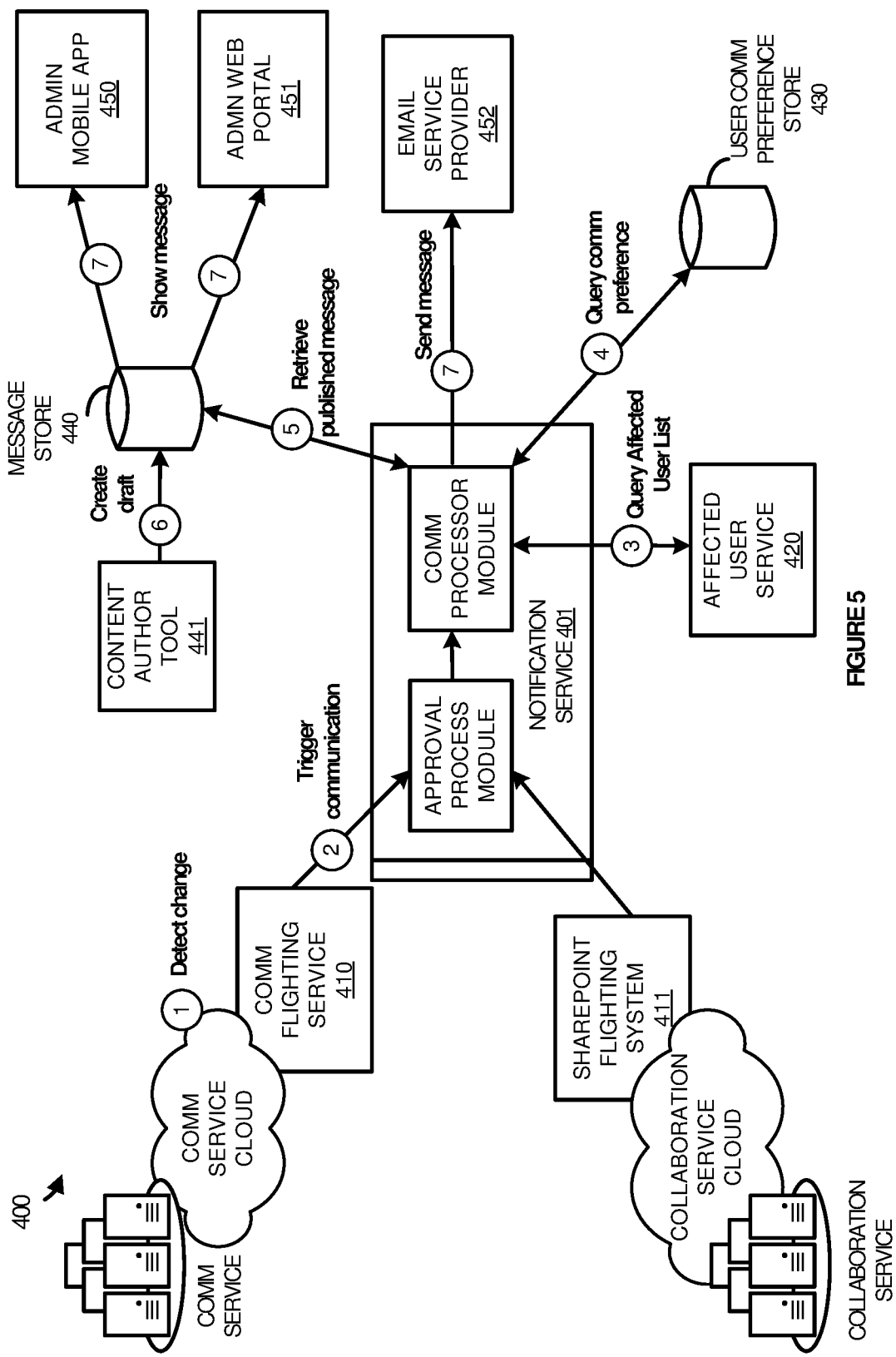
FIG. 5 illustrates an alternative operational scenario in an implementation of an enhanced notification service.

FIG. 5 illustrates a set of operations for detecting real-time (or near real-time) flight changes in a flighting system and notifying affected users using generated notifications that may be used in one or more implementations of the present technology. In operation, a product service manager may trigger a change in a feature by activating, deactivating, updating, or some other modification to the feature to a service feature in a user product. In a next operation, the approval process module monitors flighting service 410 and detects that a modification to a feature in flighting service 410 has been triggered. The approval process module may then determine that the modification to the feature made in flighting services 410 qualifies for user notifications.

In a third operation, the communication processor module processes modification to the feature s qualifying for user notifications and queries affect user service 420 to identify users requiring the notification. Affected user service 420 may respond with a list of affected users. The list of affected users may include user a user status, such as administrator users, first release users, or some other type of user status. In other implementations, the affected user list may also include the user communication preference. However, in a fourth operation, the communication processor module queries a user communication preference store to determine a preferred communication method for each of the affected users on the affected user list requiring a user notification.

In a fifth operation, the communication processor module queries message store 430 for a customized message that is to be used to alert the affected users of the modification to the feature in the software application. In a sixth operation, content author tool 441 drafts and transfers the notification message for the modified feature based on the flight name and associated content. Message store 430 receives the customized message from content author tool 441 and transfers the customized message back to the communication processor module of notification service 401. In a final operation, message store 440 and notification service 401 deliver the notification message to each of the affected users based on each user's preference over administrator mobile application 450, administrator web application 451, and email service provider 452.

Figure 6:
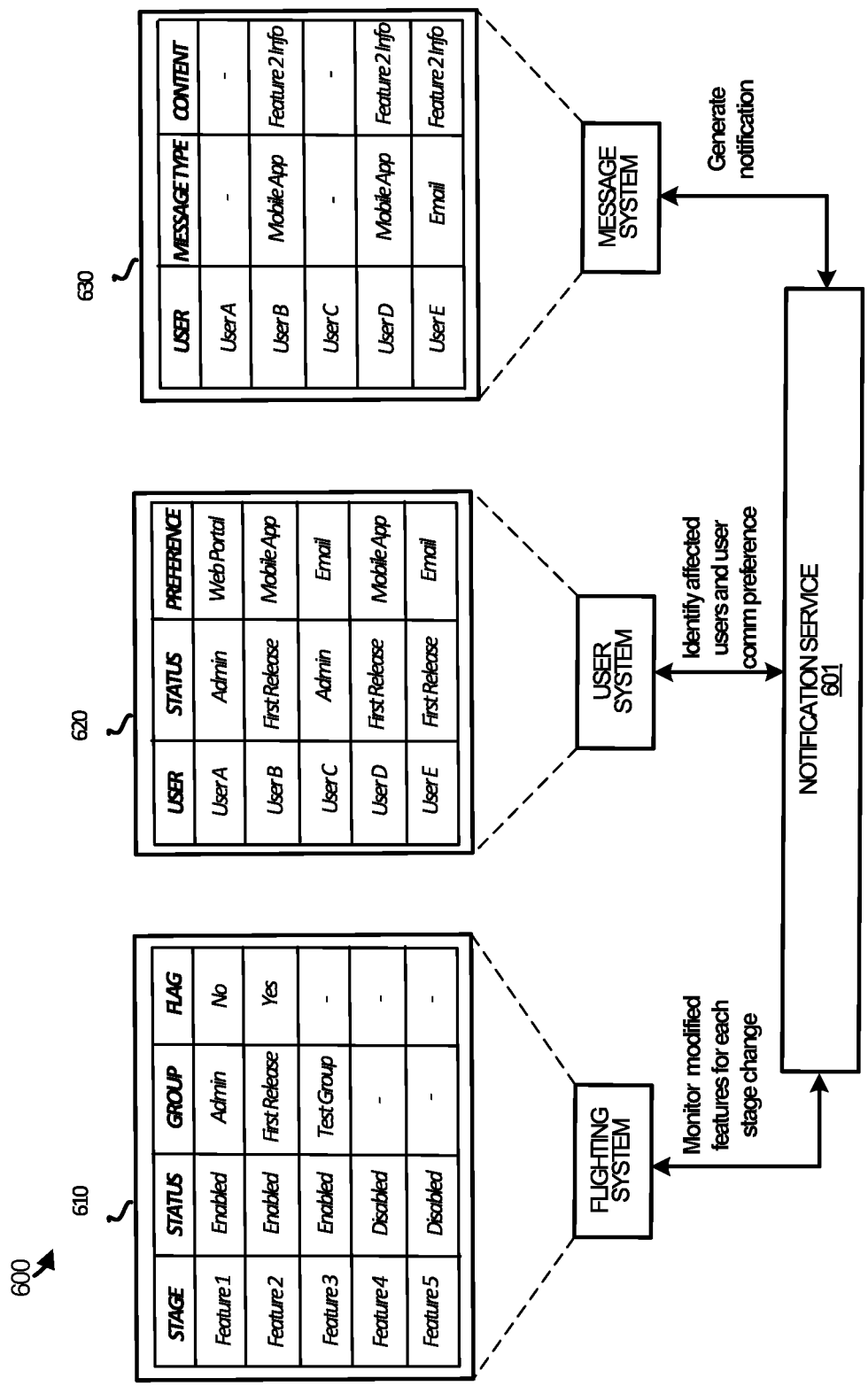
FIG. 6 illustrates an operational architecture in an implementation of an enhanced notification service.

FIG. 6 illustrates a set of operations for detecting a flagged flight and notifying affected users based on user communication preferences according to one or more implementations of the present technology. As shown in FIG. 6, a notification service 601 communicates between flighting service 610, user service 620, and message service 630.

Flighting service 610 is used to communicate changes in feature status for the current stage of the rollout process to notification service 601. Flighting service 610 comprises various stages of a product rollout process, each of which may activate, deactivate, or update one or more features by a service program manager. Select stages associated with modification to the feature s may be flagged to indicate that the change in feature status requires a notification of the modification to the feature to selected users. For example, a service program manager may initiate the next stage of the product rollout, such as stage 3. In response to stage 3 being initiated, feature 3 is updated to a new version. As shown by the "YES" in the flag field, the update to feature 3 requires a notification to selected user. The update to feature 3 is then communicated to notification service 601.

User service 620 is used to identify affected users of the modification to the feature based on a user status. User service 620 is also used to identify a user communication preference to be used when transmitting notifications to the user. User service 620 comprises a database associating each user of the product with a user status and a user communication preference. Notification service 601 may query user service 620 for user statuses and notification preference based on affected users of the update to feature 3. In this example, only administrator users are to be notified about the update to feature 3. Therefore, user service 620 communicates that User A and User C are affected users of the update to feature 3. User service 620 also communicates that User A prefers to be notified in the web portal application and User C prefers to be notified by email.

Message service 630 is used to automatically generate messages based on the modification to the feature. Message service 630 may automatically populate the content field of the notification with information within the scope of the modification to the feature by matching a flight name for updated feature 3 with an associated flight field in message service 630. Message service 630 then generates a web portal message including the notification information for User A and an email message including the notification information for User C. The messages will subsequently be used to deliver the modification to the feature information to administrator User A and administrator User C. Notification service 601 then receives the automatically drafted messages and delivers the web portal message to User A and the email message to User C.

FIG. 7 illustrates computing system 701, which is representative of any system or collection of systems in which the various applications, services, scenarios, and processes disclosed herein may be implemented. Examples of computing system 701 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 701 may be implemented as a single apparatus, system, or device or may be implemented in a distributed manner as multiple apparatuses, systems, or devices. Computing system 701 includes, but is not limited to, processing system 702, storage system 703, software 705, communication interface system 707, and user interface system 709. Processing system 702 is operatively coupled with storage system 703, communication interface system 707, and user interface system 709 (optional).

Processing system 702 loads and executes software 705 from storage system 703. Software 705 includes process 706, which is representative of the processes discussed with respect to the preceding FIGS. 1-6, including notifying process 200. When executed by processing system 702 to enhance a notification service, software 705 directs processing system 702 to operate as described herein for at least the various processes, operational scenarios, and sequences discussed in the foregoing implementations. Computing system 701 may optionally include additional devices, features, or functionality not discussed for purposes of brevity.

Referring still to FIG. 7, processing system 702 may comprise a micro-processor and other circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, graphical processing unites, application specific processors, and logic devices, as well as any other type of processing device, combination, or variation.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. Software 705 may include program instructions for implementing notifying process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software, virtual machine software, or other application software, in addition to or that include process 706. Software 705 may also comprise firmware or some other form of machine-readable processing instructions executable by processing system 702.

In general, software 705 may, when loaded into processing system 702 and executed, transform a suitable apparatus, system, or device (of which computing system 701 is representative) overall from a general-purpose computing system into a special-purpose computing system to enhance notification of a feature modification in a software application to affected users. Indeed, encoding software 705 on storage system 703 may transform the physical structure of storage system 703. The specific transformation of the physical structure may depend on various factors in different implementations of this description. Such factors may include, but are not limited to, the technology used to implement the storage media of storage system 703 and whether the computer-storage media are characterized as primary or secondary storage, as well as other factors.

If the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 707 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 709 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 709. In some cases, the input and output devices may be combined in a single device, such as a display capable of displaying images and receiving touch gestures. The aforementioned user input and output devices are well known in the art and need not be discussed at length here. User interface system 709 may also include associated user interface software executable by processing system 702 in support of the various user input and output devices discussed above.

Communication between computing system 701 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

Example 1

A computing apparatus comprising: one or more computer readable storage media; a processing system operatively coupled to the one or more computer readable storage media; and an application stored on the one or more computer readable storage media and comprising program instructions that, when executed by the processing system, direct the processing system to at least, maintain a database comprising a list of the features in the software application and a list of users associated with each of the features; detect at least a modification to a feature in the software application that requires affected users to be notified; query the database based at least on an identify of the feature associated with the modification to identify the affected users; and generate and communicate notifications to the affected users indicative of at least the modification to the feature in the software application.

Example 2

The computing apparatus of Example 1 wherein the program instructions instruct the processing system to detect at least the modification to the feature in the software application by the program instructions instructing the processing system to monitor a flighting system and detect the modification to the feature in the flighting system based on one of: a feature activation in the software application and a feature deactivation in the software application.

Example 3

The computing apparatus of Examples 1-2 wherein select features on the list of features include a flag indicating that the modification to the feature in the software application qualifies for the notification to the affected users.

Example 4

The computing apparatus of Examples 1-3 wherein the program instructions instruct the processing system to query the database based at least on the identity of the feature associated with the modification to identify the affected users by the program instructions instructing the processing system to query a topology expansion service for a user status for each of the affected users associated with the modification to the feature.

Example 5

The computing apparatus of Examples 1-4 wherein the program instructions further instruct the processing system to determine a set of administrative users based on the user status of each of the affected users requiring the notification of the modification to the feature in the software application.

Example 6

The computing apparatus of Examples 1-5 wherein the program instructions instruct the processing system to generate the notification by the program instructions instructing the processing system to retrieve content data indicating information associated with the modification to the feature in the software application and generate the notification including the content data for each of the affected users.

Example 7

The computing apparatus of Examples 1-6 wherein the program instructions instruct the processing system to communicate the notification to the affected users indicative of at least the modification to the feature in the software application by the program instructions instructing the processing system to determine a user communication preference for each of the affected users and communicate the notification to each of the affected users based on the user communication preference for each of the affected users.

Example 8

The computing apparatus of Examples 1-7 wherein the user communication preference for each of the affected users comprises at least one of a web application message, an email, and a mobile application message.

Example 9

A method of operating a notification service for notifying affected users of modifications made to features in a software application, the method comprising: maintaining a database comprising a list of the features in the software application and a list of users associated with each of the features; detecting at least a modification to a feature in the software application that requires affected users to be notified; querying the database based at least on an identity of the feature associated with the modification to identify the affected users; and generating and communicating notifications to the affected users indicative of at least the modification to the feature in the software application.

Example 10

The method of Example 9 wherein detecting at least the modification to the feature in the software application comprises monitoring a flighting system and detecting the modification to the feature in the flighting system based on a feature activation in the software application and a feature deactivation in the software application.

Example 11

The method of Examples 9-10 wherein select features on the list of features include a flag indicating that the modification to the feature in the software application qualifies for the notification to the affected users.

Example 12

The method of Examples 9-11 wherein querying the database based at least on the identity of the feature associated with the modification to identify the affected users comprises querying a topology expansion service for a user status for each of the affected users associated with the modification to the feature.

Examples 13

The method of Examples 9-12 further comprising, determining a set of administrative users based on the user status of each of the affected users requiring the notification of the modification to the feature in the software application.

Example 14

The method of Examples 9-13 wherein generating the notification comprises retrieving content data indicating information associated with the modification to the feature in the software application and generating the notification including the content data for each of the affected users.

Example 15

The method of Examples 9-14 wherein communicating the notification to the affected users indicative of at least the modification to the feature in the software application comprises determining a user communication preference for each of the affected users and communicating the notification to each of the affected users based on the user communication preference for each of the affected users.

Example 16

The method of Examples 9-14 wherein the user communication preference for each of the affected users comprises at least one of a web application message, an email, and a mobile application message.

Example 17

One or more computer readable storage media having program instructions stored thereon for notifying affected users of modifications made to features in a software application, wherein the program instructions, when executed by a processing system, direct the processing system to at least: maintain a database comprising a list of the features in the software application and a list of users associated with each of the features; detect at least a modification to a feature in the software application that requires affected users to be notified; query the database based at least on an identify of the feature associated with the modification to identify the affected users; and generate and communicate notifications to the affected users indicative of at least the modification to the feature in the software application.

Example 18

The one or more computer readable storage media of Example 17 wherein the program instructions instruct the processing system to detect at least the modification to the feature in the software application by the program instructions instructing the processing system to monitor a flighting system and detect the modification to the feature in the flighting system based on one of: a feature activation in the software application and a feature deactivation in the software application, wherein select features on the list of features include a flag indicating that the modification to the feature in the software application qualifies for the notification to the affected users.

Example 19

The one or more computer readable storage media of Examples 17-18 wherein the program instructions instruct the processing system to query the database based at least on the identity of the feature associated with the modification to identify the affected users by the program instructions instructing the processing system to query a topology expansion service for a user status for each of the affected users associated with the modification to the feature and to determine a set of administrative users based on the user status of each of the affected users requiring the notification of the modification to the feature in the software application.

Example 20

The one or more computer readable storage media of Examples 17-19 wherein the program instructions instruct the processing system to communicate the notification to the affected users indicative of at least the modification to the feature in the software application by the program instructions instructing the processing system to determine a user communication preference for each of the affected users and communicate the notification to each of the affected users based on the user communication preference for each of the affected users, wherein the user communication preference for each of the affected users comprises at least one of a web application message, an email, and a mobile application message.

What is claimed is:

1. A method of operating a notification service for notifying affected users of modifications made to features in a software application, the method comprising:
maintaining a database comprising a list of the features in the software application and a list of users associated with each of the features, wherein at least one feature on the list of features includes a flag indicating that a modification to the feature in the software application qualifies as a major update that requires affected users to be notified;
monitoring a fighting system and detecting that a modification was made in the fighting system to the feature in the software application that requires the affected users to be notified;
querying the database based at least on an identity of the feature associated with the modification to identify the affected users; and
generating and communicating notifications to the affected users indicative of at least the modification to the feature in the software application.

2. The method of claim 1, wherein the modification to the feature in the flighting system is detected based on a feature activation in the software application and a feature deactivation in the software application.

3. The method of claim 1, wherein the major update that requires the affected users to be notified is a major update in a rollout process of the software application.

4. The method of claim 1, wherein querying the database based at least on the identity of the feature associated with the modification to identify the affected users comprises querying a topology expansion service for a user status for each of the affected users associated with the modification to the feature.

5. The method of claim 4, further comprising, determining a set of administrative users based on the user status of each of the affected users requiring the notification of the modification to the feature in the software application.

6. The method of claim 1, wherein generating the notification comprises retrieving content data indicating information associated with the modification to the feature in the software application and generating the notification including the content data for each of the affected users.

7. The method of claim 1, wherein communicating the notification to the affected users indicative of at least the modification to the feature in the software application comprises determining a user communication preference for each of the affected users and communicating the notification to each of the affected users based on the user communication preference for each of the affected users.

8. The method of claim 7, wherein the user communication preference for each of the affected users comprises at least one of a web application message, an email, and a mobile application message.

9. A computing apparatus for notifying affected users of modifications made to features in a software application comprising:
one or more computer readable storage media;
a processing system operatively coupled to the one or more computer readable storage media; and
an application stored on the one or more computer readable storage media and comprising program instructions that, when executed by the processing system, direct the processing system to at least:
maintain a database comprising a list of the features in the software application and a list of users associated with each of the features, wherein at least one feature on the list of features includes a flag indicating that a modification to the feature in the software application qualifies as a major update that requires affected users to be notified;
monitor a fighting system and detect that a modification was made in the fighting system to the feature in the software application that requires the affected users to be notified;
query the database based at least on an identify of the feature associated with the modification to identify the affected users; and
generate and communicate notifications to the affected users indicative of at least the modification to the feature in the software application.

10. The computing apparatus of claim 9, wherein the modification to the feature in the flighting system is detected based on one of: a feature activation in the software application and a feature deactivation in the software application.

11. The computing apparatus of claim 9, wherein the major update that requires the affected users to be notified is a major update in a rollout process of the software application.

12. The computing apparatus of claim 9, wherein the program instructions instruct the processing system to query the database based at least on the identity of the feature associated with the modification to identify the affected users by the program instructions instructing the processing system to query a topology expansion service for a user status for each of the affected users associated with the modification to the feature.

13. The computing apparatus of claim 12, wherein the program instructions further instruct the processing system to determine a set of administrative users based on the user status of each of the affected users requiring the notification of the modification to the feature in the software application.

14. The computing apparatus of claim 9, wherein the program instructions instruct the processing system to generate the notification by the program instructions instructing the processing system to retrieve content data indicating information associated with the modification to the feature in the software application and generate the notification including the content data for each of the affected users.

15. The computing apparatus of claim 9, wherein the program instructions instruct the processing system to communicate the notification to the affected users indicative of at least the modification to the feature in the software application by the program instructions instructing the processing system to determine a user communication preference for each of the affected users and communicate the notification to each of the affected users based on the user communication preference for each of the affected users.

16. The computing apparatus of claim 15, wherein the user communication preference for each of the affected users comprises at least one of a web application message, an email, and a mobile application message.

17. One or more computer non-transitory readable storage media having program instructions stored thereon for notifying affected users of modifications made to features in a software application, wherein the program instructions, when executed by a processing system, direct the processing system to at least:

maintain a database comprising a list of the features in the software application and a list of users associated with each of the features, wherein at least one feature on the list of features includes a flag indicating that a modification to the feature in the software application qualifies as a major update that requires affected users to be notified;

monitor a fighting system and detect that a modification was made in the fighting system to the feature in the software application that requires the affected users to be notified;

query the database based at least on an identify of the feature associated with the modification to identify the affected users; and generate and communicate notifications to the affected users indicative of at least the modification to the feature in the software application.

18. The one or more non-transitory computer readable storage media of claim 17, wherein the program instructions instruct the processing system to detect the modification to the feature in the software application based on one of: a feature activation in the software application and a feature deactivation in the software application, and wherein the major update that requires the affected users to be notified is a major update in a rollout process of the software application.

19. The one or more non-transitory computer readable storage media of claim 17, wherein the program instructions instruct the processing system to query the database based at least on the identity of the feature associated with the modification to identify the affected users by the program instructions instructing the processing system to query a topology expansion service for a user status for each of the affected users associated with the modification to the feature and to determine a set of administrative users based on the user status of each of the affected users requiring the notification of the modification to the feature in the software application.

20. The one or more non-transitory computer readable storage media of claim 17, wherein the program instructions instruct the processing system to communicate the notification to the affected users indicative of at least the modification to the feature in the software application by the program instructions instructing the processing system to determine a user communication preference for each of the affected users and communicate the notification to each of the affected users based on the user communication preference for each of the affected users, wherein the user communication preference for each of the affected users comprises at least one of a web application message, an email, and a mobile application message.

* * * * *